Patented Dec. 15, 1931

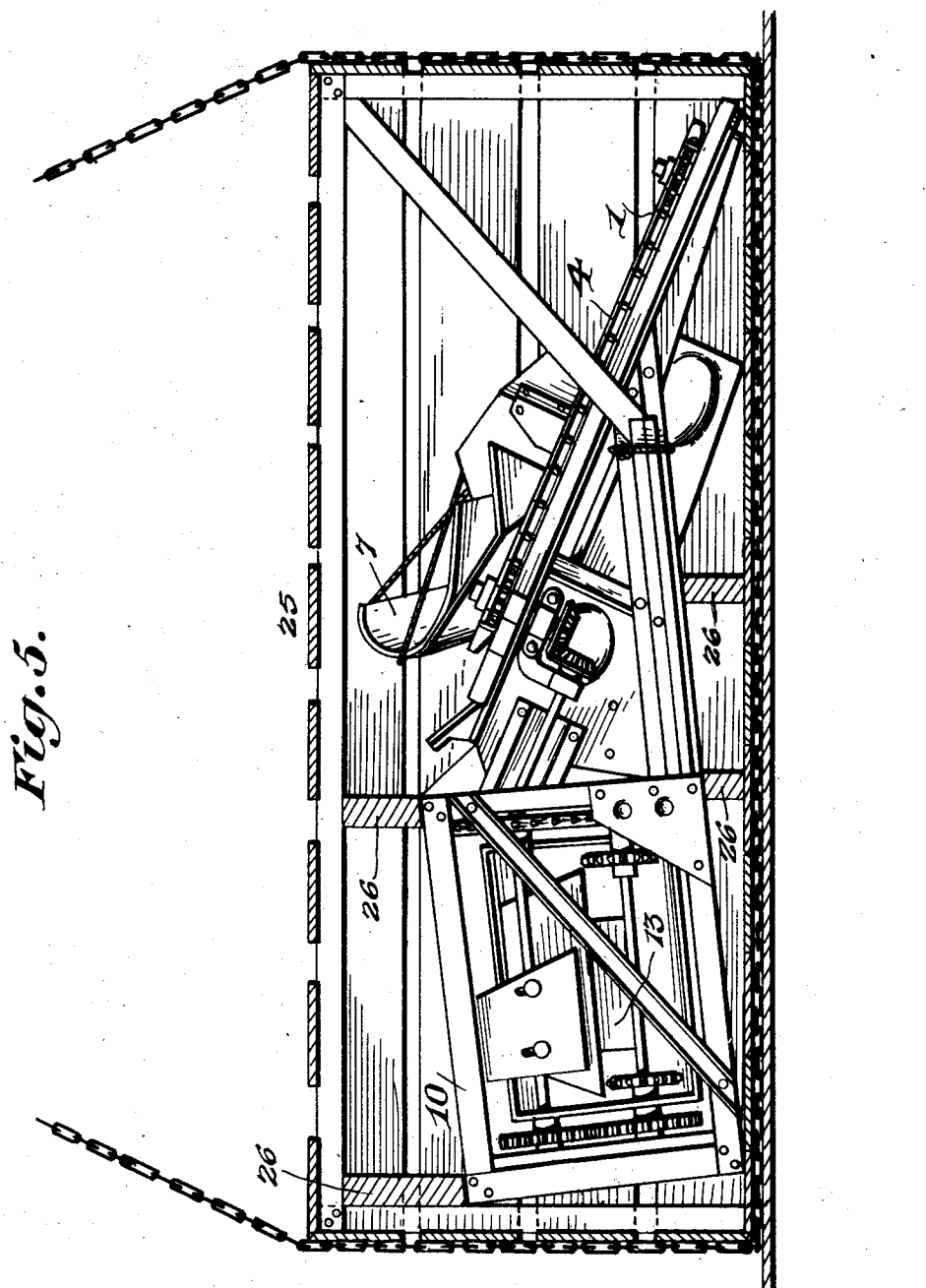

1,837,062

UNITED STATES PATENT OFFICE

THEODORE H. OPPENHEIM, OF COLDWATER, OHIO, ASSIGNOR TO THE NEW IDEA SPREADER CO., OF COLDWATER, OHIO, A CORPORATION OF OHIO

MEANS FOR AND METHOD OF CRATING AND SHIPPING CORN PICKERS

Application filed February 27, 1930. Serial No. 431,911.

The object of this invention is to so dispose the parts of a corn picker or harvester that a larger number of machines may be placed within a freight car than has been heretofore possible, the space within the car most advantageously utilized, and transportation charges reduced. It is also an object to arrange the parts so that the working mechanism may be properly tested and adjusted at the factory and shipped intact so that the work of setting up the machine at its destination will be simplified and facilitated. The invention will be hereinafter fully set forth and defined with reference to the accompanying drawings.

In the drawings:

Fig. 5 is a view illustrating a method of crating for exportation.

Figure 1:
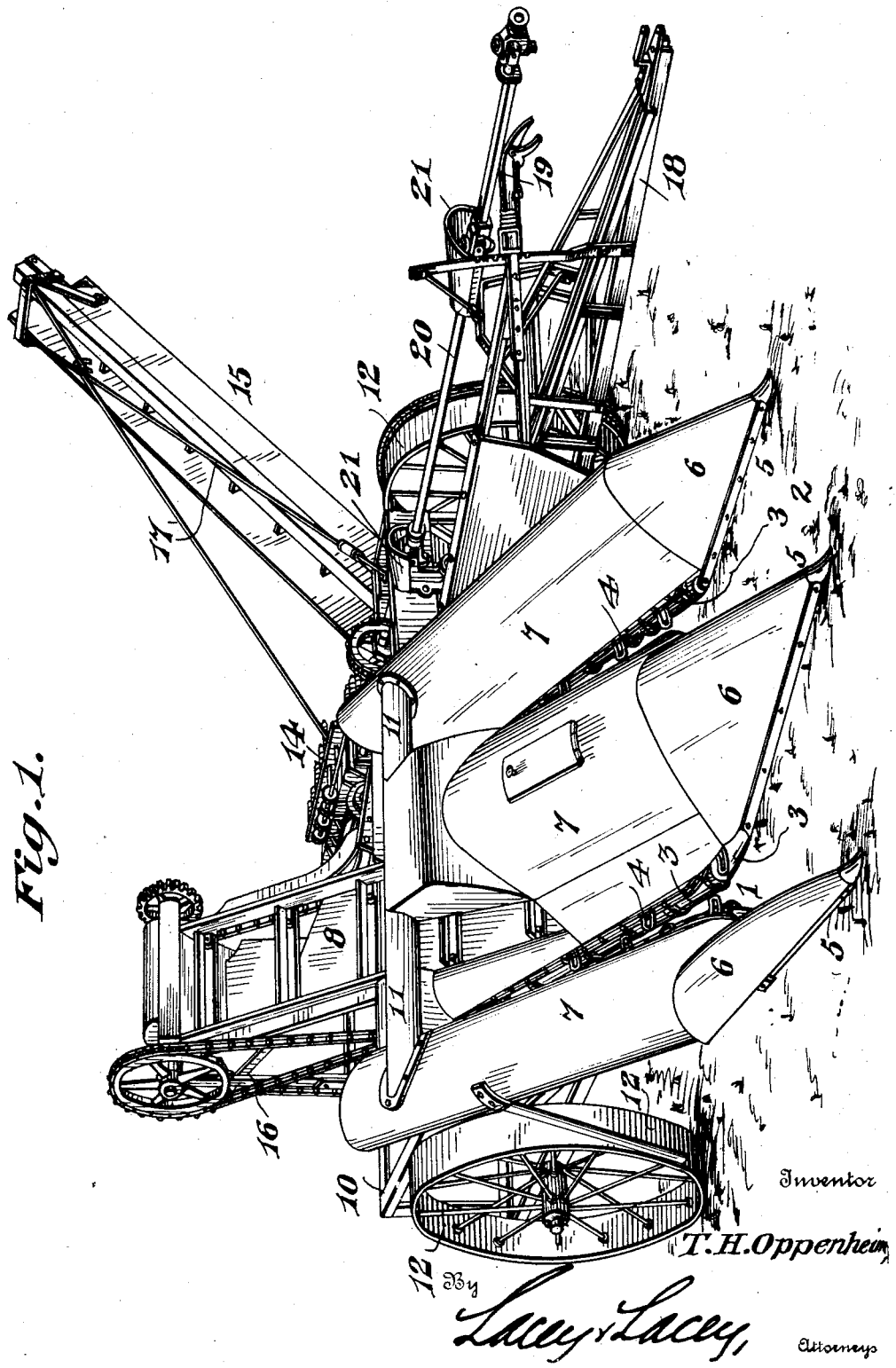
Figure 1 is a perspective view of a corn picker or harvester arranged for use.

The invention is more particularly concerned with a two-row corn picker or harvester which comprises two gathering mechanisms, indicated at 1 and 2, each of which includes snapping rollers 3 arranged in pairs and adapted to snap the ears of corn from the stalks as the machine is drawn over a field, and chains 4 whereby the stalks are held to the snapping rollers. Gathering points 5 extend forward from the snapping rollers and are usually hinged to the supports for the snapping rollers whereby they follow irregularities in the ground surface and readily pass under fallen corn stalks and lift the same to be effectually engaged by the snapping rollers. Hoods 6 are provided over the gathering points and similar hoods 7 are arranged over the snapping rollers to support the stalks and prevent them falling into and clogging the operating parts. The snapping rollers deliver the ears to a conveyer, indicated at 8, which carries them upwardly and rearwardly and transfers them to husking rolls arranged at 9 in the main frame 10. At the rear of the hoods 7 is a transverse sheet-metal tube 11 which extends across and above the elevator 8 so that it forms a stop to prevent long stalks from working up to the limit of the snapping rolls. The main frame 10 is a rectangular structure supported at its ends by ground wheels 12 which are mounted on stub axles secured in the frame, and the husking rolls and the gearing for driving all the working parts are mounted in this frame. Below the husking rolls, in the main frame, is a mechanism 13 for saving shelled corn and discharging the husks, and, above the husking rolls, pressing wheels 14 are mounted on the frame to hold the ears to the husking rolls. At one end of the main frame is set a conveyer 15 which receives the ears from the husking rolls and delivers said ears to a wagon driven alongside the picker.

The upper portion of the elevator 8 is supported by posts or bars 16 which are bolted or otherwise detachably secured to the top of the main frame, and the conveyer 15 is held in position by brace rods 17 attached thereto at or near the upper end thereof and detachably engaged with the main frame.

The machine is usually drawn by a tractor and the equipment includes a draft frame 18 which is attached at its rear end to the main frame at one side of the gathering devices, and has its front end properly constructed to be coupled to the drawbar of the tractor, said draft frame being provided with a tilting lever 19. There is also provided a telescopic jointed shaft 20 which is to be coupled to the power take-off of the tractor and has its rear end engaged with a master gear to transmit motion to all the working parts, caps or hoods 21 being provided over the universal joints in said shaft.

Figure 3:
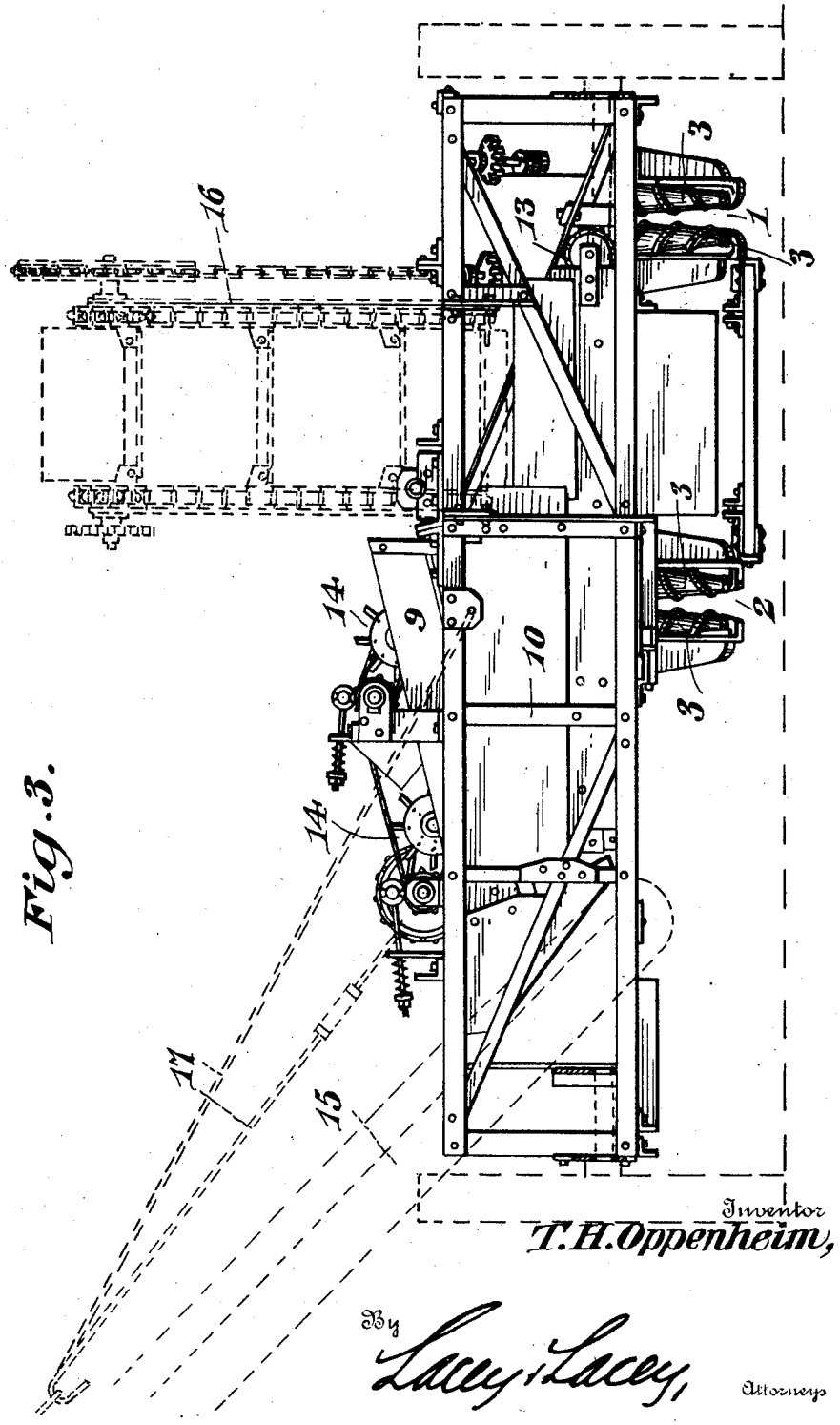
Fig. 3 is a rear elevation with parts removed but their positions indicated by dotted lines.
Figure 4:
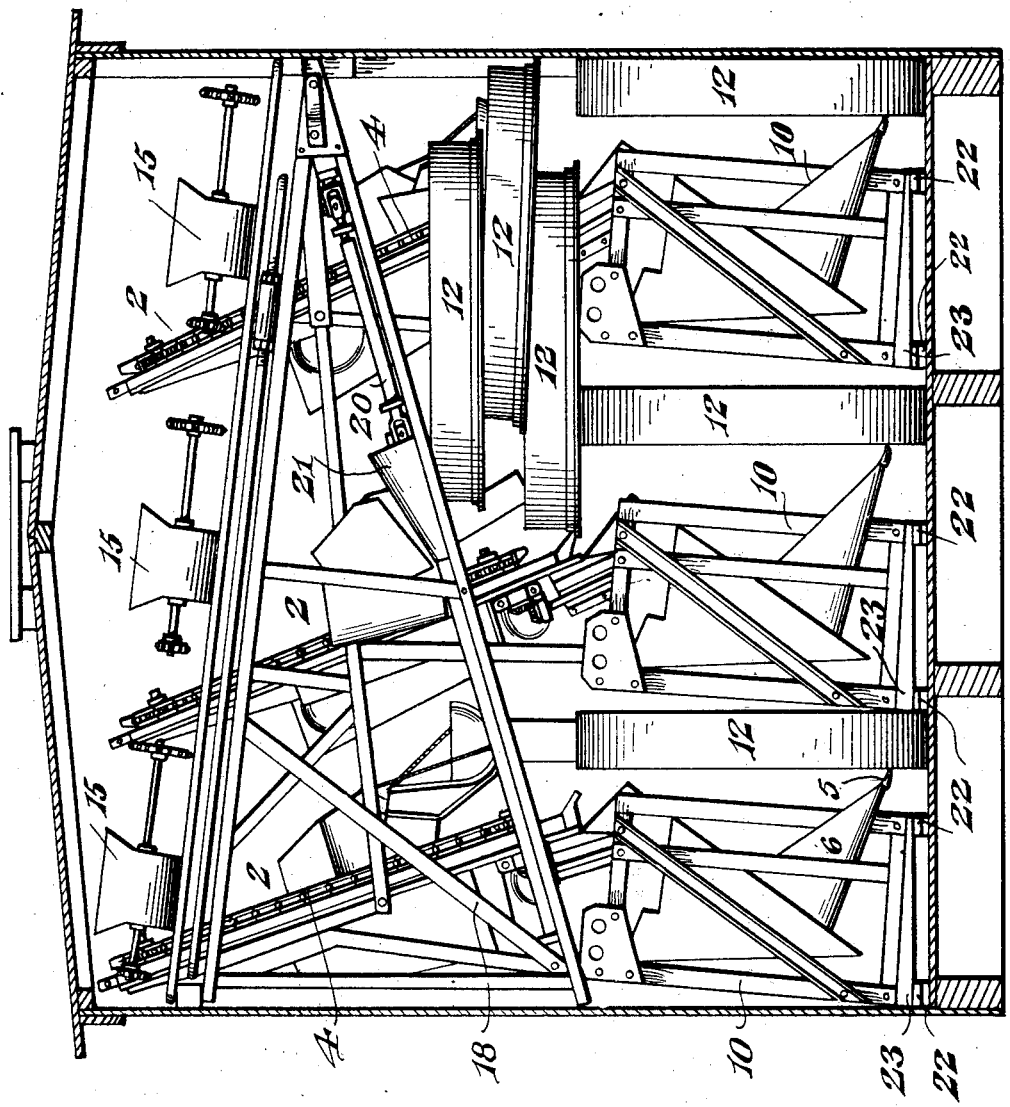
Fig. 4 is a view showing machines disposed within a freight car.

When a machine is to be shipped, the draft frame, power shaft, tilting lever, conveyer 15 and the upper portion of the elevator 8 are removed. The ground wheels are removed and skids or shoes 22 are connected to the back of the main frame to facilitate moving and protect the finish thereof during further manipulation and transportation, tapered blocks 23 being interposed between the frame and the skids so that, when the machine is up-ended to rest on the skids, the gathering points will be brought close to or within the lines of the base and the machine balanced. The hoods and covers are placed within the main frame above the mechanism 13 and secured by tie wires or similar means. The upper portion of the conveyer 8 is pushed within the main frame and secured. The power shaft with its caps or hoods is tied on the side of the draft frame. The main frame is then turned over on its back to rest on the skids and is placed upon a factory truck, as shown in Fig. 3, to be moved into a car or place of storage, and it will be seen, upon reference to Fig. 4, that a large number of machines may be easily arranged within a car and secured firmly without requiring the use of a large quantity of lumber for bracing purposes. The machine, in the position shown in Fig. 3, is wheeled into the car and slid from the truck onto the floor of the car close to the side of the car with the long dimension of the main frame extending lengthwise of the car. It is possible to get three machines crosswise of the car, as shown, and a few wedges or other stops around the main frames on the car floor will suffice to hold them firmly against movement during travel of the car. The triangular draft frames are placed side by side on top of and across the main frames, as shown, and the wagon elevators are placed over the draft frames. The ground wheels may be placed between the adjacent main frames and over the same below the ends of the draft frames.

When the machine is to be shipped beyond continental United States, it is necessary to lay the machine down and I then place the main frame with the husking and snapping units and gearing intact in a crate 25, as in Fig. 5, and insert wedging blocks 26 between the sides of the crate and the frame of the machine to hold the machine against movement. The hitch frame, lever, truss, ground wheels, power shaft and tractor guard are put in a second crate, and the wagon elevator, with its connections, is put in a third crate.

It will be readily noted that by my method of shipping the machine, the working parts are practically all left in their working positions undisturbed by the shipping operations, and they may be thoroughly tried out at the factory and adjusted so that they may remain intact and need not be shifted in any way by the consignee The hitching devices, elevator, wheels and extra chutes and a few shields are of such characteristics that they may be very easily and quickly assembled with the other parts without requiring the services of a skilled mechanic and, therefore, the labor of setting up the machine for work is minimized and facilitated. The space within the car which is not actually filled by the crated machines may be utilized for the storage of extra wheels and other small parts.

Figure 2:
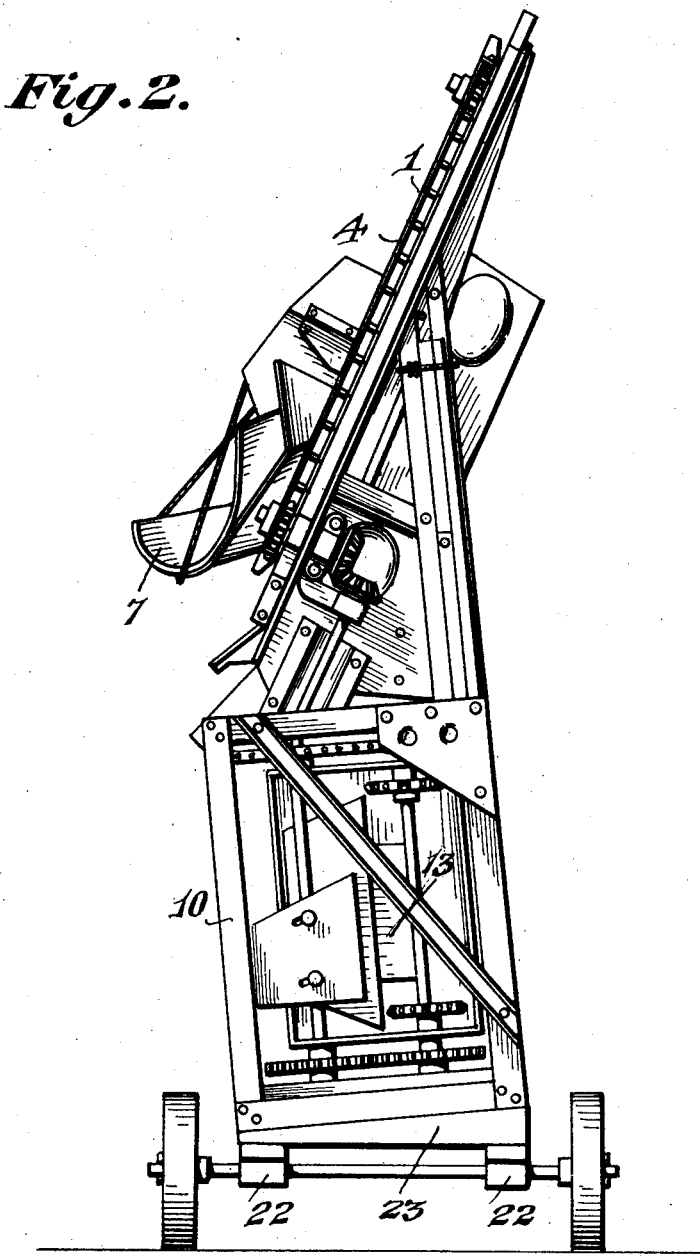
Fig. 2 is an end elevation of the corn picker or harvester ready to be disposed within a freight car.

Upon reference to Figs. 2 and 3, it will be noted that the main frame forms in effect a box or rectangular crate within which the husking rolls and the shelled corn saver may be permanently secured and, with the gearing for driving them, will lie entirely within the lines of the frame. The lower portion of the central elevator 8 is secured to the main frame, and the upper portion of said elevator may be readily detached, while the elevator 15 is removable. The gathering and snapping mechanism is permanently mounted on the front of the main frame, and all the working parts will be thoroughly tested and given final adjustment at the factory and shipped intact, the draft frame, power-take-off frame, ground wheels and axles, elevator 15, and upper portion of the elevator 8 being detached for shipment. The box-like form of the main frame gives it a back of substantial area so that it will rest firmly when the front of the machine is swung upwardly to the position shown in Fig. 2.

Having thus described the invention, I claim:

1. The improvement in the art of crating and shipping in freight cars and other carriers corn harvesters in which the snapping elements, husking elements and gearing for operating said elements are intact and previously adjusted for use, which consists in removing the ground wheels, draft frame and power-applying elements, resting the machine on its back with the snapping elements, husking elements and gearing in an upright position, and disposing the removed members about the frame of the machine.

2. The improvement in the art of crating and shipping in freight cars and other carriers corn harvesters having body frames and in which the snapping elements, husking elements and gearing for operating said elements are intact and in operative position on the frame and adjusted for use, which consists in removing the ground wheels, draft frame and power-applying elements, setting the machine on its back with the snapping elements, husking elements and gearing extending in an upright position, inserting wedge members beneath the back of the frame for tilting the latter to cause said elements to be balanced with respect to the frame, and disposing the removed elements about the frame of the machine.

3. The improvement in the art of crating and shipping in freight cars and other carriers corn harvesters having body frames and in which the snapping elements, husking elements and gearing for operating said elements are intact and in operative position on the frame and previously tested and adjusted for use, which consists in removing the ground wheels, draft frame and power-applying elements, setting the machine in an upright position so that the weight thereof will be sustained by the back of the frame with the snapping elements, husking elements and gearing in an upright position, applying skids to the back of the frame, interposing wedge shaped members between the skids and said frame to balance the elements with respect to the frame, and disposing the removed elements about the frame of the machine.

4. The improvement in the art of crating and shipping in freight cars and other carriers corn harvesters in which certain of the operating elements thereof are intact and previously adjusted for use, which consists in removing the ground wheels, draft frame and power-applying elements, resting the machine on its back with said operating elements in an upright position, balancing the harvester while resting on its back to maintain said operating elements in an upright position during transit, and disposing the removed members about the frame of the machine.

5. The improvement in the art of crating and shipping in freight cars and other carriers corn harvesters having body frames and in which certain of the operating elements thereof are intact and previously adjusted for use, which consists in removing the ground wheels, draft frame and power applying elements, resting the machine on its frame with said intact operating elements in operative position relative to the frame, and chocking the frame to prevent movement thereof during transit.

In testimony whereof I affix my signature.
THEODORE H. OPPENHEIM. [L. S.]